Feb. 3, 1948. B. JOHNSEN 2,435,444
DEVICE FOR LAUNCHING TORPEDOES
Filed March 27, 1945 2 Sheets-Sheet 2
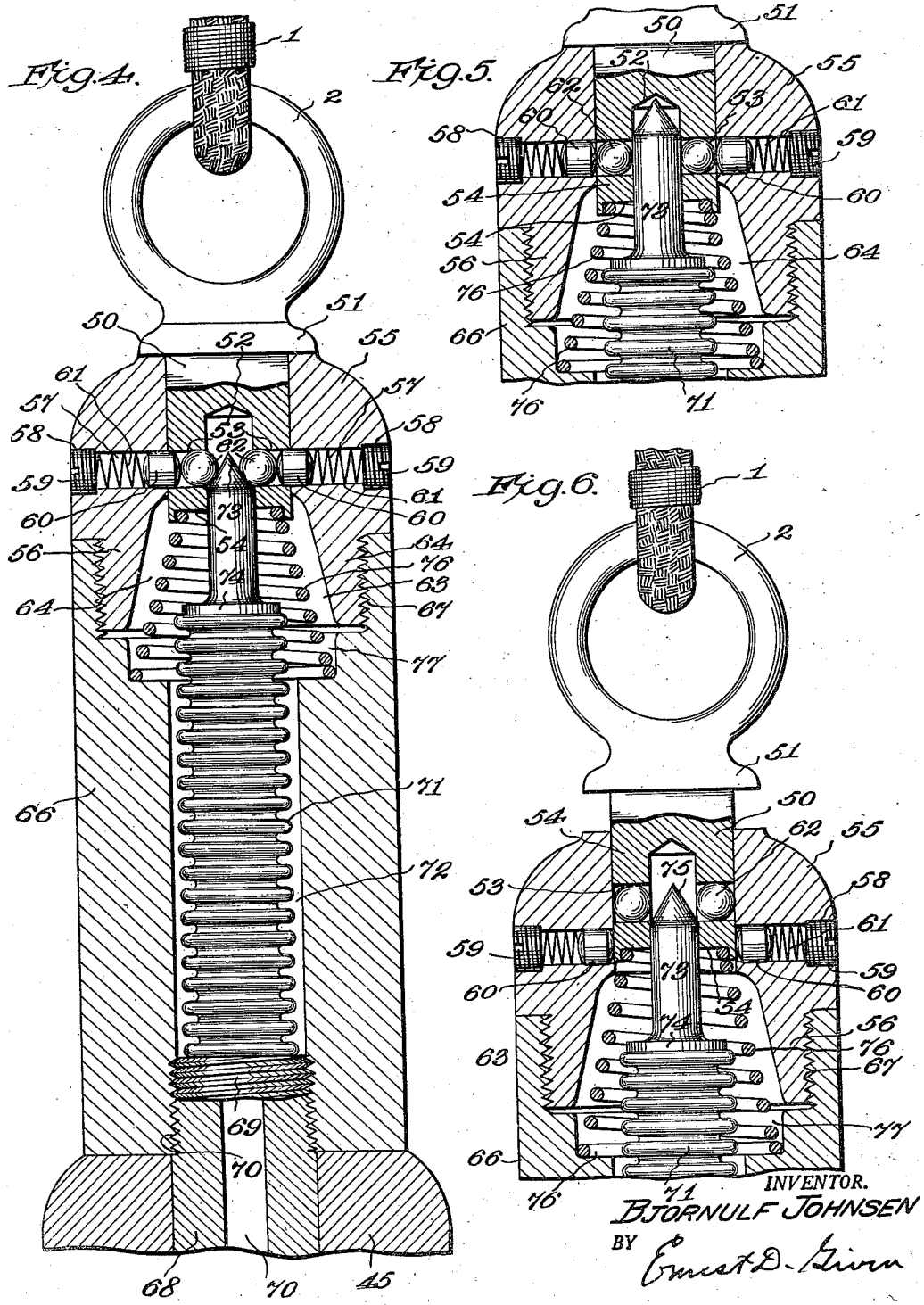
INVENTOR.
BJORNULF JOHNSEN
BY Ernest D. Given
ATTORNEY Patented Feb. 3, 1948

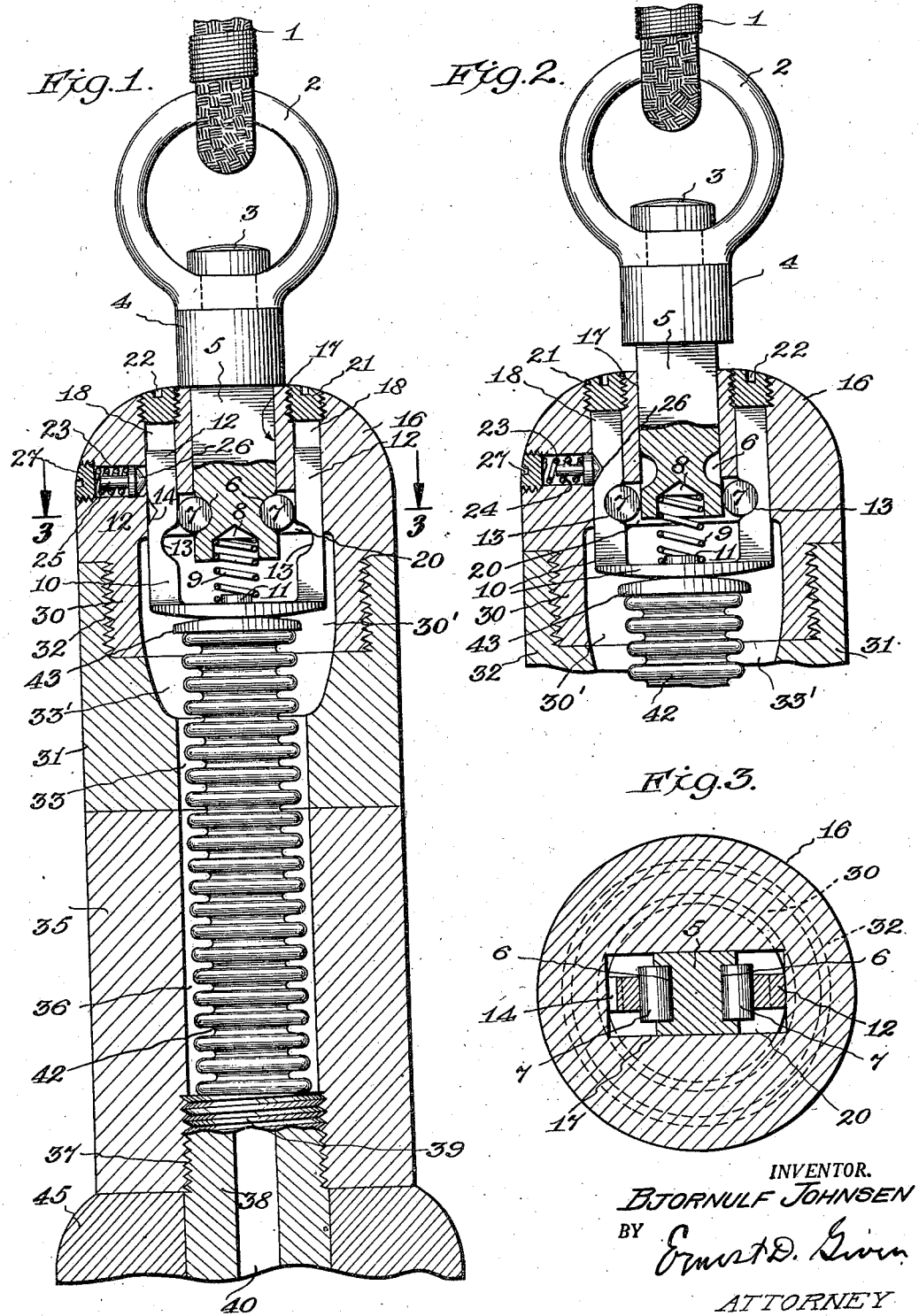

2,435,444

UNITED STATES PATENT OFFICE 2,435,444

DEVICE FOR LAUNCHING TORPEDOES

Bjornulf Johnsen, Summit, N. J., assignor to Leonard P. Frieder, New York, N. Y.

Application March 27, 1945, Serial No. 585,170

11 Claims. (Cl. 114—239)

This invention relates to a device for launching torpedoes from aircraft.

It is useful for launching torpedoes that contain compressed air for driving the propellers of the torpedoes. By the present invention a duct is connected from the compressed air chamber of the torpedo to the present device in such a way that when the torpedo is launched and the compressed air valve is open, the compressed air will reach the device and disconnect it from the cable or shroud lines of a parachute that support the torpedo or the like.

When the torpedo strikes the water, the released compressed air is applied to the device, such as a parachute release, in such a way that the torpedo can proceed on its way.

The invention may be understood from the description in connection with the accompanying drawings, in which Fig. 1 is a longitudinal section through an illustrative embodiment of the invention;

Fig. 2 is part of a similar section showing portions in different relative positions;

Fig. 3 is a section along the line 3—3 of Fig. 1;

Fig. 4 is a longitudinal section similar to Fig. 1 through a modification of the invention;

Fig. 5 is a broken away portion showing parts of Fig. 4 in different positions; and Fig. 6 is a similar section showing parts in other positions.

In Fig. 1, reference character 1 indicates a cable or shroud line which may be attached to a parachute and is connected to the ring 2 which is swivelled on rod 3 that is provided with a cylindrical block 4 and a pin 5 that is rectangular in cross-section and has semi-circular grooves 6 on opposite sides thereof into which rollers 7 may enter. This pin 5 is also provided with a seat or recess 8 at the lower end for a compression spring 9.

A stirrup 10 with a boss which receives the lower end of the spring 9, has upwardly projecting arms 12 provided along their inner edges with semi-circular grooves 13 thereacross. A V-shaped notch 14 extends across the outer side of one of the arms 10.

A circular head 16 is provided with a rectangularly-shaped opening 17 for the pin 5. Similar openings 18, square in cross-section, are provided in the head 16 for the arms 12. These openings 18 merge into larger openings 20 at a lower point.

Screw-plugs 21 with screw driver slots 22 therein are threaded into the upper threaded ends of the openings 18. A hole 23 is provided through one side of the head 16. A spring 24 is located in the hole 23 and presses a pin 25, which has a conical head 26, inwardly when the threaded plug 27 is screwed into place.

An externally threaded projection 30 is provided at the bottom of the head 16 and has an enlarged opening 30' in its lower portion. A circular block 31 with an internally threaded portion 32 is screwed to the threaded portion 30. The central opening 33 through the block 31 has an enlarged portion 33' to correspond to the opening 30'.

A circular block or sleeve 35 of the same diameter as the block 31 has a central longitudinal opening 36 therethrough meeting with and corresponding to the opening 33. The lower end of the opening 36 is threaded as shown at 37.

A threaded connecting member or tube 38 has its upper threaded end 39 fitting into the screw-threaded portion 37. It is provided with a central longitudinal opening or duct 40 for compressed air. A Sylphon or bellows 42 is hermetically sealed to the upper end of the tube 38. A plate 43 having an upper rounded surface is provided at the upper end of the Sylphon 42 and bears against the lower end of the stirrup 10.

Reference character 45 indicates an extension on a torpedo that is to be launched.

The operation is as follows. The torpedo, of which a portion is shown at 45, is carried by the cable 1 extending from an aircraft or parachute to the ring 2. When the torpedo strikes the water and the propeller is thereby started in the normal way, the valve in the compressed air line is opened in the usual way and communication is thereby established with the duct 40. The compressed air passing through this duct into the Sylphon 42 pushes the stirrup 10 and arms 12 upwardly until the head 26 of the pin 25 enters the notch 14. The ends of the arms 12 are then contacted with the plugs 21 and 22. At this time the rollers 7 enter the grooves 13, as shown in Fig. 2. Thereupon, the compression spring 9 pushes the pin 5 out and releases it from the device, whereupon the propeller of the torpedo keeps it on its course while the aircraft or parachute that had carried the torpedo can move away out of the danger zone.

In the modification shown in Figs. 4, 5 and 6, the ring 2 corresponds to the one already described. In this modification the pin 50, which is rectangular in cross-section, is integral with the plate 51 of the ring 2. A central longitudinal opening 52 in the lower end of pin 50 is circular in cross-section. Aligned transverse holes 53 are provided through the walls of the opening 52.

A spring seat 54 is provided in the lower end of pin 50.

A head 55 that is circular in cross-section, is provided with a threaded extension 56. Transverse aligned openings 57 extend through the head 55 and have threaded outer ends 58 in which threaded plugs 59 having screw driver slots are inserted. Cylindrical plugs 60 with spherical ends are located in the openings 57 with compression springs 61 between them and the plugs 59. Balls 62 are located in the transverse openings 53 and are of the same diameter as the plugs 60.

A conically-shaped opening 63 is provided in the lower portion of the head 55. This portion has external threads 64. An elongated block or sleeve 66 is provided with a threaded portion 67 which engages the threads 64 of the extension 56.

A tube 68 passes through the nose 45 of the torpedo. Its screw-threaded end 69 is screwed into the internal threads 70 at the lower end of the sleeve 66. A Sylphon 71 is located in the opening 72 of the sleeve 66. A pin 73 having its base 74 contacting with the upper end of the Sylphon 71, has its other end 75 shaped conically and extending into the opening 52 between the balls 62. A compression spring 76 of conical shape is seated in the enlarged opening 77 at the upper end of the sleeve 66 and has its small end extending into the spring seat 54 in the lower end of the pin 50.

The operation of the device shown in Figs. 4 to 6 is as follows.

When the torpedo is launched, the compressed air in the Sylphon 71 pushes the pin 73 upwardly, thereby moving the balls 62 outwardly, thus forcing the cylinders 60 outwardly against the pressure of the springs 57 so that the pin 50 is free to move out and release the torpedo, as shown in Figs. 5 and 6. In view of the fact that the base of the spring 76 is of a larger diameter than the hole in which the pin 50 is inserted, the only portion that is carried away by the aircraft is the ring 2 and pin 50.

What is claimed is:

1. A device for launching torpedoes which comprises a member adapted to be extended by compressed air, a carrier for said member to which said member is attached, said carrier being connected to said torpedo, a pull member connected to said carrier, and means operated by said first-named member adapted to disconnect said carrier from said pull member when said torpedo is launched.

2. The device of claim 1 in which a compression spring is adapted to press said pull member outwardly.

3. The device of claim 1 in which a compression spring is adapted to press said pull member outwardly and means are provided to prevent said pull member from becoming accidentally detached.

4. A device for launching torpedoes which comprises interengaging threaded housing members, a pin, a holder in one of said housing members for said pin, means for retaining said pin in one of said housing members and pneumatically operable means for releasing said pin.

5. A device for launching torpedoes which comprises threaded housing members, a pin, a holder in one of said housing members for said pin, means for retaining said pin in one of said housing members, pneumatically operable means for releasing said pin and a spring urging said pin outwardly.

6. The device of claim 4 in which said pin retaining means comprises a roller.

7. The device of claim 4 in which said pin retaining means comprises a ball.

8. A device for launching and releasing torpedoes which comprises an elongated hollow member, means for connecting said member to a torpedo whereby compressed air in said torpedo can enter said member, means for connecting said member to a tow line and means operable by said compressed air for disconnecting said tow line from said member.

9. The device of claim 8 in which said last named means comprises a bellows.

10. The device of claim 8 in which said last named means comprises a compression spring.

11. The device of claim 8 in which said last named means comprises a holding member movable at right angles to the center line of said elongated hollow member.

BJORNULF JOHNSEN.

REFERENCES CITED

The following references are of record in the file of this patent:

UNITED STATES PATENTS

| Number | Name | Date |
| --- | --- | --- |
| 1,821,599 | Weidman | Sept. 1, 1931 |